(12) United States Patent
Chuah et al.

(10) Patent No.: US 7,733,896 B2
(45) Date of Patent: Jun. 8, 2010

(54) DYNAMIC ACCESS PRIORITY SCHEME

(75) Inventors: Mooi Choo Chuah, Marlboro, NJ (US);
Tingfang Ji, Highland Park, NJ (US);
Wei Luo, Eatontown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2348 days.

(21) Appl. No.: 10/222,785

(22) Filed: Aug. 19, 2002

(65) Prior Publication Data

US 2004/0032877 A1 Feb. 19, 2004

(51) Int. Cl.
*H04B 1/00* (2006.01)
*H04B 7/216* (2006.01)
*H04W 4/00* (2009.01)
*G06F 15/16* (2006.01)

(52) U.S. Cl. .................. 370/444; 370/329; 370/335; 370/418; 455/69; 709/217

(58) Field of Classification Search ......... 370/328–347, 370/445–465, 235–252, 412–418; 455/63–69, 455/435–572; 725/105–131; 709/217–225
See application file for complete search history.

(56) References Cited

U.S. PATENT DOCUMENTS

| | | | | | |
|---|---|---|---|---|---|
| 5,134,714 | A | * | 7/1992 | Janzen et al. | 455/512 |
| 5,297,144 | A | * | 3/1994 | Gilbert et al. | 370/346 |
| 5,461,639 | A | * | 10/1995 | Wheatley et al. | 370/342 |
| 5,682,604 | A | * | 10/1997 | Kashi et al. | 370/448 |
| 6,112,101 | A | * | 8/2000 | Bhatia et al. | 455/512 |
| 6,226,277 | B1 | * | 5/2001 | Chuah | 370/328 |
| 6,400,695 | B1 | * | 6/2002 | Chuah et al. | 370/310 |
| 6,594,240 | B1 | * | 7/2003 | Chuah et al. | 370/328 |
| 6,643,318 | B1 | * | 11/2003 | Parsa et al. | 375/141 |
| 6,674,765 | B1 | * | 1/2004 | Chuah et al. | 370/458 |
| 6,771,632 | B2 | * | 8/2004 | Dick et al. | 370/342 |
| 6,788,937 | B1 | * | 9/2004 | Willenegger et al. | 455/434 |
| 6,917,602 | B2 | * | 7/2005 | Toskala et al. | 370/335 |
| 7,058,407 | B2 | * | 6/2006 | Chi et al. | 455/449 |
| 7,095,754 | B2 | * | 8/2006 | Benveniste | 370/465 |
| 7,177,658 | B2 | * | 2/2007 | Willenegger et al. | 455/522 |
| 2003/0119452 | A1 | * | 6/2003 | Kim et al. | 455/69 |
| 2003/0194992 | A1 | * | 10/2003 | Kim et al. | 455/414.1 |
| 2004/0087320 | A1 | * | 5/2004 | Kim et al. | 455/458 |
| 2004/0146019 | A1 | * | 7/2004 | Kim et al. | 370/329 |
| 2004/0208136 | A1 | * | 10/2004 | Dick et al. | 370/280 |
| 2006/0189272 | A1 | * | 8/2006 | Willenegger et al. | 455/3.01 |
| 2007/0071025 | A1 | * | 3/2007 | Bergstrom et al. | 370/448 |

* cited by examiner

*Primary Examiner*—M. Phan
(74) *Attorney, Agent, or Firm*—Harness, Dickey & Pierce

(57) ABSTRACT

In the dynamic access priority method, priority classes with different backoff delays are used to prioritize random access over shared channels and to reduce collision in the presence of a surge of random access requests. Service class information for a plurality of service classes is stored at user equipment. The service class information for a service class includes at least one of a maximum and a minimum back off value; the maximum back off value being indicative of a maximum back off interval and the minimum back off value being indicative of a minimum back off interval. At least one of a maximum and a minimum back off value is determined based on a selected service class of the user equipment, and a back off interval is determined based on the determined back off value. The back off interval indicates a period of time the user equipment waits before the user equipment attempts a transmission.

13 Claims, 3 Drawing Sheets

ONE SET OF BACKOFF TIMER LIMITS:

$T_{BO1}{}^a, T_{BO1}{}^b \sim U(N_{BO1min}, N_{BO1max}) * 10ms$

LET $N_{BO1min} = 0, N_{BO1max} = 3$ $\Longrightarrow T_{BO1}{}^a = 30ms, T_{BO1}{}^b = 20ms$
$\Longrightarrow$ COLLISION!

DYNAMIC ACCESS PRIORITY SCHEME

BACKGROUND OF THE INVENTION

Multimedia broadcast/multicast service (MBMS) is a point to multipoint service in which data is transmitted from a single source entity to multiple users. The main objective of MBMS study is to take advantage of the fact that the same data is transmitted to multiple users, so that network resources can be efficiently shared among users.

Referring to FIG. 1, which shows a portion of the well-known architecture for MBMS within a 3GPP network, when MBMS data is available for delivery, a serving GPRS support node SGSN will send a MBMS notification to relevant radio network controllers RNCs. These RNCs will then ask NodeBs (also known as base stations) to send relevant paging messages to notify interested users via their equipment UEs. Some of these UEs will be in idle states, while others will be may be in a Cell_PCH state (a state in which the UE has been assigned a dedicated airlink with a NodeB) or URA_PCH state (a state in which the UE is still connected with the network by one or more shared communication channels, but not a dedicated airlink). The UEs in the Cell_PCH/URA_PCH or idle states have to send a paging response when they are paged. The paging response is sent via a RACH (Random Access CHannel). Since many users may subscribe to a MBMS service, the network will see a surge in RACH contention messages. Such surges will cause large collisions on the RACH channel.

Existing specifications or protocols provide many RACH transmission control parameters some of which control the use of the RACH when collisions occur. The UE is provided with the RACH transmission control parameters when service provisioning takes place, and updates the RACH transmission control parameters based on system information. The RACH transmission control parameters include Physical RACH (PRACH), Access Service Class (ASC), maximum number of permitted RACH transmission attempts Mmax, maximum back off value NBO1max and minimum back off value NBO1min. The PRACH indicates the physical RACH over which the UE will attempt to communicate with the network. The ASC indicates the partition i of the PRACH in which to attempt to communicate with the network and the persistence value Pi (probability that a UE attempts a transmission). The UE stores and updates the information on each ASC and determines the ASC to use during transmission based on an Access Class (AC) assigned to the UE by the network. The maximum back off value NBO1max and minimum back off value NBO1min are described in detail below, but are associated with the assigned PRACH such that each UE assigned to the same PRACH has the same maximum back off value NBO1max and minimum back off value NBO1min.

FIG. 2 illustrates a flow chart of the conventional RACH access process performed at a UE when data is to be transmitted. As shown, in step S10, the UE maps the assigned AC to an ASC. The UE will use this ASC for transmissions other than an emergency transmission (e.g., 911 calls). Then in step S12, a count value M is set to zero, and in step S14, the count value M is incremented by one. Next, in step S16, the UE determines if the count value M representing the number of transmission attempts exceeds the maximum number of permitted RACH transmission attempts Mmax. If so, then the UE treats the transmission as unsuccessful. However, if M is less than or equal to the maximum number of permitted RACH transmission attempts Mmax, then in step S18 the UE updates the RACH transmission control parameters.

Next, in step S20, a 10 ms timer T2 is set. In step S22, the UE decides whether to attempt transmission based on the persistence value Pi associated with the ASC selected by the UE. Specifically, a random number Ri is generated between zero and 1. If the random number Ri is less than or equal to the persistence value Pi, the UE attempts to transmit over an assigned PRACH at the partition i indicated by the selected ASC in step S24; otherwise, the UE waits till the 10 ms timer T2 expires in step S26 and processing proceeds to step S18.

In step S30, the UE determines whether the network responds with an ACKnowledgement (ACK), a Non-ACKnowledgment (NACK), or no response. If no response is received from the network, after the timer T2 expires in step S32, processing proceeds to step S14. If an ACK (indicating receipt of the UE transmission by the network) is received, then in step S34 the UE begins further transmission. If a NACK (indicating a failed receipt of the transmission by the network—often due to collision) is received, then the UE waits for the timer T2 to expire in step S36 before proceeding to step S38. In step S38, the UE generates a back off value NBO1 randomly chosen between the maximum and minimum back off values NBO1max and NBO1min associated with the PRACH assigned to the UE. The UE then waits a back off interval TBO1 equal to 10 ms times the back off value NBO1 before proceeding to step S14 and re-attempting transmission.

As demonstrated in FIG. 3, even with the back off methodology discussed above, future collisions are possible. As shown in FIG. 3, UEa and UEb have a collision event as shown at 10. According to FIG. 2, each of UEa and UEb will first wait for the timer T2 to expire (step S36), and then back off further according to a calculated back off interval (step S38). As shown in FIG. 3, when both UEa and UEb are assigned to the same PRACH, then UEa and UEb have the same maximum and minimum back off values. Because the back off interval range for both UEa and UEb completely overlap, it is highly likely that a future collision occurs. For example, with the NBO1min=0 and the NBO1max=3 for both UEa and UEb, it is entirely possible that UEa calculates a back off interval TBO1a of 30 ms and UEb calculates a back off interval TBO1b of 20 ms. Because the transmission burst duration is not negligible, another collision occurs as shown at 12 in FIG. 3.

SUMMARY OF THE INVENTION

In one embodiment of the present invention, the maximum and/or minimum back off values, which indicate the maximum and minimum back off interval, form part of the service class information associated with each service class. Consequently, by providing different maximum and/or minimum back off values for different service classes and assigning user equipment a particular service class, a measure of control over the back off interval determined by user equipment is obtained. This allows the creation of higher priority and lower priority service classes, with high priority service classes having smaller maximum and/or minimum back off values. To lessen the impact of MBMS on the RACH, UEs subscribing to a particular MBMS service, group of MBMS services, or any MBMS service are instructed to use a lower priority service class when responding to an MBMS notification.

In a further embodiment of the present invention, to lessen the MBMS impact on the RACH, the UEs subscribing to a particular MBMS service, group of MBMS services, or any MBMS service are instructed to use a PRACH strictly dedicated to responding to MBMS notifications.

In a still further embodiment, the information provided by the network indicates that the UEs have a higher priority service class and a lower priority service class to use when attempting to make a transmission. The UEs then select the higher priority service class when in the idle state and select the lower priority service class when in the CELL_PCH and URA_PCH states.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limitative of the present invention and wherein.

DETAILED DESCRIPTION OF THE EMBODIMENTS

As discussed above, a UE decides whether to attempt transmission based on a RACH control parameter called a persistence value (transmission probability). According to a first embodiment of the present invention, different persistence values are assigned to different ASCs. For example, higher priority ASCs are assigned larger persistence values. A larger persistence value improves the probability that transmission by a UE of that class occurs. Consequently, higher priority ASC UEs are more likely to attempt transmission than lower priority ASC UEs.

Figure 1:
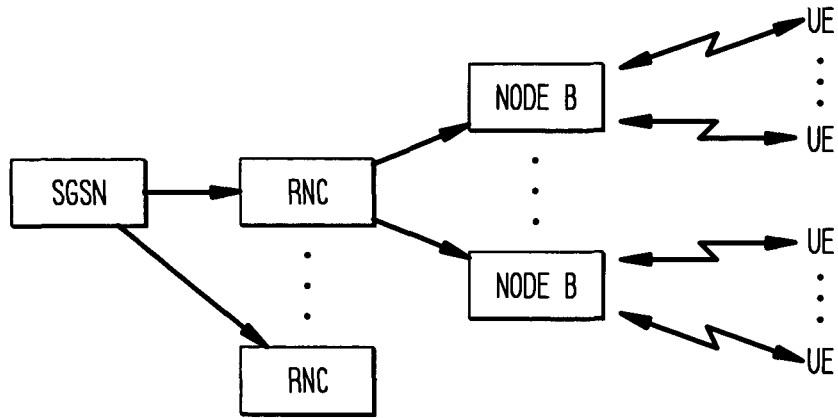
FIG. 1 illustrates a portion of the conventional architecture for MBMS within a 3GPP network.
Figure 3:
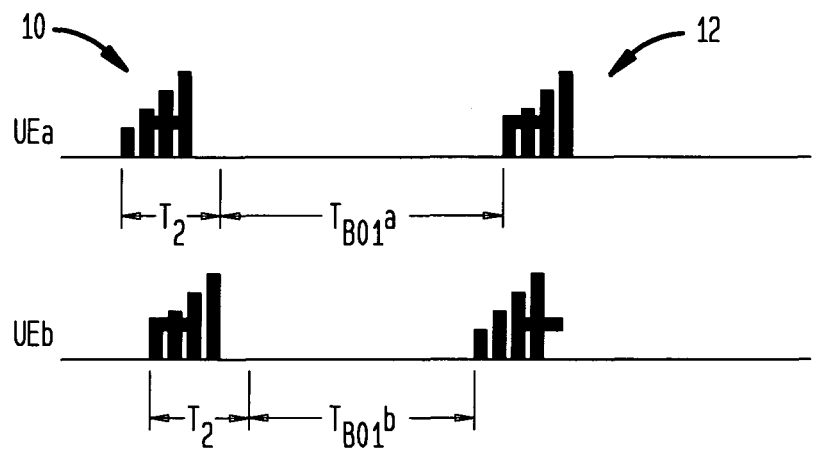
FIG. 3 illustrates a collision problem with the method illustrated in FIG. 2.
Figure 2:
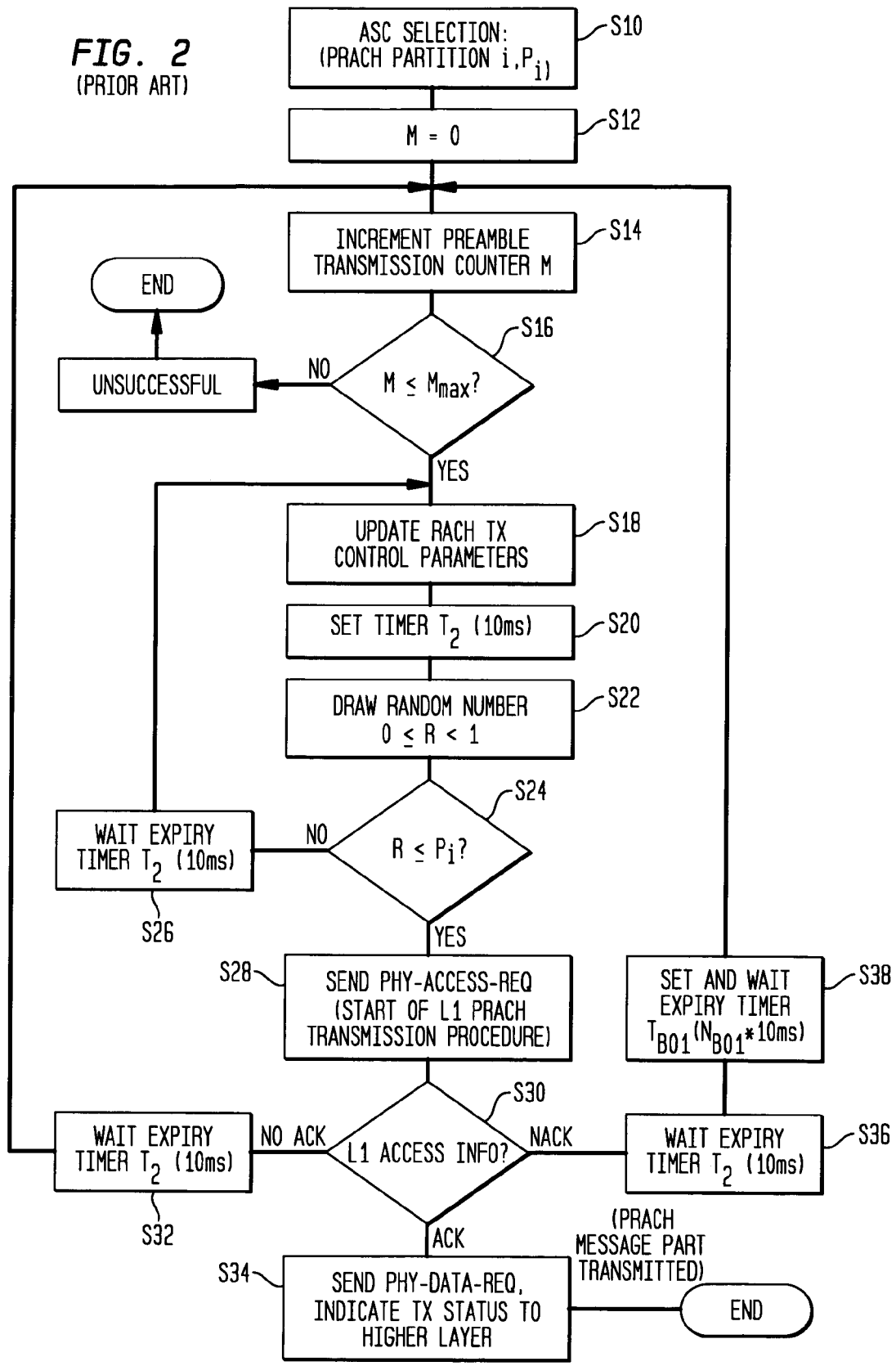
FIG. 2 illustrates a flow chart of the conventional RACH access process performed at a UE when data is to be transmitted.

When a collision occurs (e.g., the UE receives a Non-ACKnowledgement signal from the network), the UE attempts to retransmit after a back off interval (step S38 in FIG. 2). The back off interval TBO1 is set equal to 10 ms times a back off value NBO1 randomly chosen between the maximum back off value NBO1max and the minimum back off value NBO1min. According to one embodiment of the present invention, different NBO1max values and/or NBO1min values are established for different ASCs. Namely, the NBO1max and/or NBO1min values are not associated with a PRACH, and instead the selected ASC has NBO1max and/or NBO1 values forming part of the service class information. Accordingly, the UE stores and updates the NBO1min and/or NBO1max values for the ASCs, and mapping the Access Class (AC) of the UE to the ASC also provides the NBO1max and/or NBO1min values in addition to the PRACH partition i and the persistence value Pi. Stated another way, based on the selected ASC (see step S10), the UE accesses the NBO1max and/or NBO1min as part of the service class information in addition to the PRACH partition i and the persistence value Pi.

According to this embodiment, higher priority ASCs are assigned smaller NBO1max values and/or NBO1min values than lower priority ASCs. This allows UEs from different ASCs to transmit their access bursts with different back off delays, and therefore, UEs of a higher priority ASC are more likely to transmit after a smaller back off delay than UEs of a lower priority ASC.

Figure 4:
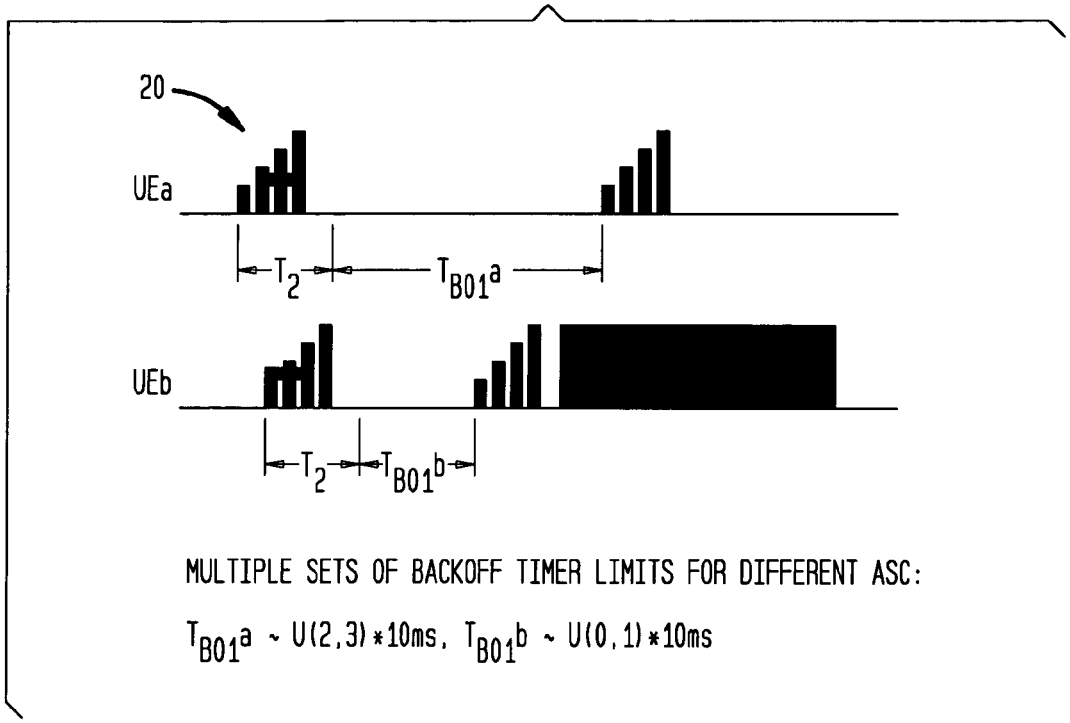
FIG. 4 illustrates how the collision problem of FIG. 3 is avoided by following the method according to an embodiment of the present invention.

As demonstrated in FIG. 4, with the back off methodology according to the present invention, future collisions are prevented. As shown in FIG. 4, UEa and UEb have a collision event as shown at 20. According to FIG. 4, each of UEa and UEb will wait for the timer T2 to expire (step S36), and then back off further according to a calculated back off interval (step S38). Because the back off interval ranges do not overlap, it is much less likely that a future collision event occurs.

This methodology is particularly useful with MBMS. To reduce contention from UEs associated with an MBMS service, group of MBMS services, or simply any MBMS service, an ASC is established for UEs associated with the MBMS service, group of MBMS services, or any MBMS service. Then, a larger NBO1max than used in at least one of the non-MBMS ASCs is associated with this ASC to spread the access bursts into longer periods.

Figure 5:
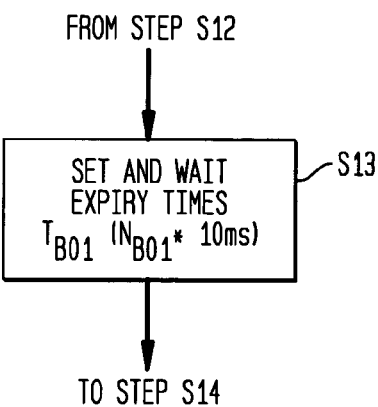
FIG. 5 illustrates a modification of the flow chart in FIG. 2 according to an embodiment of the present invention.

As a further, optional, feature of this embodiment, the UEs run a random back off using (NBO1min, NBO1max) before the first persistence test (i.e., before attempting a first transmission). Namely, after step S12 in FIG. 2, and prior to step S14, a new step S13 as shown in FIG. 5 is performed. New step S13 is the same as step S38 described above. Using this methodology, the initial transmission attempts from various UEs can be spread over time; and hence, the possibility of the UEs colliding can be reduced.

In addition to, or independent of, the above described embodiments, in a second embodiment of the present invention a different PRACH is allocated for a particular MBMS service, a group of MBMS services, or any MBMS service to prevent MBMS service related activities from impacting existing RACH related activities. Namely, the network assigns a PRACH to the UEs associated with a particular MBMS service, a group of MBMS services, or any MBMS service. In one version of this embodiment, the PRACH assigned is exclusively used for MBMS traffic; but the invention is not limited to this exclusivity.

As an additional aspect of this embodiment, the NBO1max for UEs assigned the MBMS PRACH is set larger than the NBO1max for one or more non-MBMS PRACHs to allow for more spread between different UEs trying to access the PRACH for MBMS service(s). When used with the conventional methodology of FIG. 2, the network associates one NBO1max with each PRACH as described with respect to FIG. 2. However, when this second embodiment of the present invention is used in conjunction with the first embodiment of the present invention, then the network also assigns the Access Class of the MBMS UEs such that the UEs map to ASCs having larger NBO1max values.

As is known in the art, idle UEs need a longer time to set up, for example, an RRC connection and radio bearers than UEs in the CELL_PCH and URA_PCH states. According to a third embodiment of the present invention, at least one UE in the idle state selects an ASC with a larger persistence value than persistence values associated with ASCs selected by UEs in the CELL_PCH and/or URA_PCH states. In one implementation of this embodiment, the network assigns at least one UE two different ASCs of different priorities. The higher priority ASC has a larger persistence value Pi than the lower priority ASC. The UE is programmed to choose one of the higher priority ASC and the lower priority ASC based on its state. If the UE is in the idle state, the UE will choose the higher priority ASC and if the UE is in the CELL_PCH or URA_PCH state, the UE will choose the lower priority ASC. Also, when used in conjunction with the first embodiment, the high priority ASC can have a lower NBO1max associated therewith than the NBO1max associated with the lower priority ASC. When used in conjunction with the conventional methodology, each PRACH is assigned two NBO1max values—one greater than the other. Idle UEs then select the smaller NBO1max, and CELL_PCH and URA_PCH UEs select the greater NBO1max.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A dynamic access priority method, comprising:
   storing service class information for a plurality of service classes, at user equipment, the service class information for a service class including a maximum back off value and a persistence value, the maximum back off value being indicative of a maximum back off interval, the persistence value indicates a probability that the user equipment attempts transmission, and the persistence value of the a higher priority service class is greater than the persistence value of a lower priority service class;
   first determining a maximum back off value based on a selected service class of the user equipment; and
   second determining a back off interval based on the determined maximum back off value, the back off interval indicating a period of time to wait before the user equipment attempts a transmission.

2. The method of claim 1, wherein the plurality of service classes include at least the higher priority service class and the lower priority service class, the higher priority service class having a higher priority than the lower priority service class, and the maximum back off value of the higher priority service class being less than the maximum back off value of the lower priority service class.

3. The method of claim 1, further comprising:
   receiving information indicating that the user equipment select the lower priority service class when the user equipment responds to a multimedia broadcast/multicast service (MBMS) notification.

4. The method of claim 1, further comprising:
   receiving information indicating that the user equipment select a service class between a higher priority service class and a lower priority service class;
   third determining a state of the user equipment; and
   selecting one of the higher priority service class and the lower priority service class based on the determined state of the user equipment.

5. The method of claim 1, wherein
   the service class information for a service class includes a minimum back off value, the minimum back off value being indicative of a minimum back off interval;
   the first determining step determines a maximum and a minimum back off value based on the selected service class of the user equipment; and
   the second determining step determines the back off interval based on the determined maximum back off value and the determined minimum back off value.

6. The method of claim 5, wherein the plurality of service classes include at least one service class having a higher priority than another, lower priority, service class, and the maximum and minimum back off values of the higher priority service class are less than the maximum and minimum back off values, respectively, of the lower priority service class.

7. The method of claim 6, wherein
   the service class information for a service class includes a persistence value, the persistence value indicates a probability that the user equipment attempts transmission, and the persistence value of the higher priority service class being is than the persistence value of the lower priority service class.

8. The method of claim 7, further comprising:
   receiving information indicating that the user equipment select the lower priority service class when the user equipment responds to a multimedia broadcast/multicast service (MBMS) notification.

9. The method of claim 7, further comprising:
   receiving information indicating that the user equipment select a service class between a higher priority service class and a lower priority service class;
   third determining a state of the user equipment; and
   selecting one of the higher priority service class and the lower priority service class based on the determined state of the user equipment.

10. The method of claim 1, further comprising:
    performing the second determining step and waiting the determined back off interval when the user equipment receives information from a network that a transmission attempt was unsuccessful.

11. The method of claim 1, further comprising:
    performing the second determining step and waiting the determined back off interval before attempting an initial transmission.

12. A dynamic access priority method, comprising:
    sending service class information for a plurality of service classes to user equipment, the service class information for a service class including,
       a maximum back off value based on a selected service class of the user equipment, the maximum back off value being indicative of a maximum back off interval,
       a minimum back off value, and
       a persistence value, the persistence value indicating a probability that the user equipment attempts transmission; and
    sending information to the user equipment indicating that the user equipment select a lower priority service class when responding to a multimedia broadcast/multicast service (MBMS) notification, the lower priority service class having at least one of a smaller persistence value, a greater maximum back off value and a greater minimum back off value than included in the service class information of a higher priority service class.

13. The method of claim 12, further comprising:
    sending information to user equipment subscribing to a multimedia broadcast/multicast service (MBMS) that indicates the user equipment transmit responses to a MBMS notification on a particular physical random access channel (PRACH).

* * * * *